United States Patent
Kimura et al.

(10) Patent No.: US 10,308,136 B2
(45) Date of Patent: Jun. 4, 2019

(54) VEHICLE CONTROL SYSTEM

(71) Applicant: TOYOTA JIDOSHA KABUSHIKI KAISHA, Toyota-shi, Aihci-ken (JP)

(72) Inventors: Hiroaki Kimura, Toyota (JP); Tomohito Ono, Susono (JP); Hiroto Hashimoto, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 67 days.

(21) Appl. No.: 15/480,809

(22) Filed: Apr. 6, 2017

(65) Prior Publication Data
US 2017/0291504 A1    Oct. 12, 2017

(30) Foreign Application Priority Data
Apr. 11, 2016 (JP) ................... 2016-078594

(51) Int. Cl.
*B60L 15/20* (2006.01)
*B60K 6/445* (2007.10)
(Continued)

(52) U.S. Cl.
CPC .............. *B60L 15/20* (2013.01); *B60K 6/445* (2013.01); *B60L 11/12* (2013.01); *B60W 10/08* (2013.01); *B60W 20/00* (2013.01); *B60W 30/184* (2013.01); *B60L 2220/42* (2013.01); *B60L 2240/12* (2013.01); *B60L 2240/421* (2013.01); *B60L 2240/423* (2013.01); *B60L 2240/425* (2013.01); *B60L 2240/54* (2013.01); *B60L 2240/647* (2013.01); *B60L 2250/26* (2013.01); *B60L 2260/26* (2013.01); *B60W 2520/30* (2013.01); *B60W 2710/083* (2013.01); *Y02T 10/6239* (2013.01); *Y02T 10/645* (2013.01); *Y02T 10/646* (2013.01); *Y02T 10/7077* (2013.01); *Y02T 10/72* (2013.01); *Y02T 10/7275* (2013.01); *Y02T 10/7291* (2013.01); *Y02T 90/16* (2013.01)

(58) Field of Classification Search
CPC ............................... B60L 16/20; B60K 6/445
USPC ......................................................... 318/15
See application file for complete search history.

(56) References Cited

U.S. PATENT DOCUMENTS 9,885,395 B2 *  2/2018  Hibino .................. F16D 41/125
9,903,470 B2 *  2/2018  Kuwahara ........... F16H 61/0204
(Continued)

FOREIGN PATENT DOCUMENTS

JP         2013-147124 A       8/2013

*Primary Examiner* — Eduardo Colon Santana
*Assistant Examiner* — Devon A Joseph
(74) *Attorney, Agent, or Firm* — Hunton Andrews Kurth LLP

(57) ABSTRACT

A control system for a vehicle having two motors is provided to limit damage on rotary members even if an excessive torque is applied from drive wheels. The control system comprises a first motor, a second motor, and a locking mechanism, and a differential mechanism disposed between the first motor and the drive wheels. The locking mechanism halts one of rotary elements of a differential mechanism when torque of the rotary member is small, and allows the rotary element to rotate when the torque of the rotary member is large. A controller is configured to increase power output of the first motor and decrease power output of the second motor during propulsion on an uneven road surface.

10 Claims, 7 Drawing Sheets

(51) Int. Cl.
  *B60W 10/08* (2006.01)
  *B60W 20/00* (2016.01)
  *B60W 30/184* (2012.01)
  *B60L 11/12* (2006.01)

(56) References Cited

U.S. PATENT DOCUMENTS

| | | | |
|---|---|---|---|
| 2002/0011093 A1* | 1/2002 | Matsuno | B60T 8/172 |
| | | | 73/9 |
| 2005/0055149 A1* | 3/2005 | Kato | B60T 8/172 |
| | | | 701/80 |
| 2006/0003863 A1* | 1/2006 | Tabata | B60K 6/445 |
| | | | 477/2 |
| 2012/0103749 A1* | 5/2012 | Kimura | B60W 30/20 |
| | | | 192/54.1 |
| 2013/0213728 A1* | 8/2013 | Yamakawa | B62D 5/0475 |
| | | | 180/446 |
| 2016/0129901 A1* | 5/2016 | Migita | B60W 20/13 |
| | | | 701/22 |
| 2016/0258529 A1* | 9/2016 | Kuwahara | F16H 61/0204 |

* cited by examiner

VEHICLE CONTROL SYSTEM

CROSS-REFERENCE TO RELATED APPLICATIONS

The present invention claims the benefit of Japanese Patent Application No. 2016-078594 filed on Apr. 11, 2016 with the Japanese Patent Office, the disclosures of which are incorporated herein by reference in its entirety.

BACKGROUND

Field of the Disclosure

Embodiments of the present disclosure relate to the art of a control device for vehicle having at least two motors for propelling the vehicle.

Discussion of the Related Art

JP-A-2013-147124 describes a hybrid vehicle in which a prime mover includes an engine, a first motor and a second motor. An output shaft of the engine is connected to one of rotary elements of a single-pinion planetary gear unit, and the first motor is connected to another rotary element. An output element of the planetary gear unit is connected to drive wheels. The second motor is connected to a gear delivering an output torque of the planetary gear unit to the drive wheels. In order to restrict reverse rotation of the output shaft of the engine, a one-way clutch is disposed on the output shaft of the engine. In the hybrid vehicle taught by JP-A-2013-147124, when transmitting output torque of the first motor, the one-way clutch is engaged to deliver the output torque of the first motor to the drive wheels. In this situation, torque of the second motor may also be delivered to the drive wheels in addition to the output torque of the first motor.

According to the teachings of JP-A-2013-147124, in order to avoid undesirable disengagement of the one-way clutch caused by a torque applied from the drive wheels, the output torque of the first motor is increased during propulsion on an uneven road surface thereby increasing torque currently applied to the one-way clutch. In this situation, the output torque of the second motor is decreased to suppress a change in drive force caused by thus increasing the output torque of the first motor. JP-A-2013-147124 also describes a technique to maintain disengagement of the one-way clutch by controlling a rotational speed of the first motor.

According to the teachings of JP-A-2013-147124, therefore, a temporal drop in the drive force delivered to the drive wheel may be prevented by thus maintaining engagement of the one-way clutch to keep establishing reaction force. In addition, in the case of maintaining disengagement of the one-way clutch, the one-way clutch can be prevented from being subjected to an excessive torque.

However, in the case of increasing the output torque of the first motor to keep engagement of the one-way clutch, a power transmission system including the one-way clutch is subjected to the increased torque of the first motor, and may be damaged by pulsation of the torque applied from the drive wheels during propulsion on the uneven road surface.

By contrast, in the case of keeping the one-way clutch in disengagement by controlling the first motor, a drive force required by the driver may not be achieved only by the second motor. In this case, during propulsion on the uneven road surface, the pulsed torque is also applied to the power transmission system from the drive wheels in addition to the increased torque of the second motor, and hence the power transmission system may be damaged.

SUMMARY

Aspects of preferred embodiments of the present disclosure have been conceived noting the foregoing technical problems, and it is therefore an object of the present disclosure is to provide a control system for a vehicle having two motors that is configured to generate a drive force required by a driver while limiting damage on rotary members even if an excessive torque is applied from drive wheels.

The present disclosure relates to a vehicle control system that is applied to a vehicle, comprising: a first motor; a differential mechanism including a first rotary element connected to the first motor, a second rotary element connected to drive wheels, and a third rotary element connected to a rotary shaft; a second motor that applies a drive force to a power transmitting route between the differential mechanism and the drive wheels; a locking mechanism that selectively stops a rotation of the rotary shaft; and a controller that controls power outputs of the first motor and the second motor. In order to achieve the above-explained objective, according to the embodiment of the present disclosure, the locking mechanism is adapted to keep stopping the rotation of the rotary shaft when a torque of the rotary shaft is smaller than a predetermined torque, and to allow the rotary shaft to rotate when the torque of the rotary shaft is larger than a predetermined torque. In addition, the controller is configured: to estimate an input torque from the drive wheels based on a condition of a road on which the vehicle is currently travelling or on a planned route on which the vehicle is going to travel, when the vehicle is powered by the first motor and the second motor while stopping the rotation of the rotary shaft; to determine an operating point of the first motor in such a manner as to increase the power output from that of a case in which the estimated input torque is smaller than the predetermined torque, and an operating point of the second motor in such a manner as to decrease the power output from that of a case in which the estimated input torque is smaller than the predetermined torque, in a case that the estimated input torque is larger than the predetermined torque; and to operate the first motor and the second motor at the determined operating points.

In a non-limiting embodiment, the controller may be further configured to determine the operating points of the first motor and the second motor in such a manner as to achieve a required power to propel the vehicle.

In a non-limiting embodiment, the controller may be further configured: to select a combination of the operating point of the first motor determined to increase the power output and the operating point of the second motor determined to decrease the power output from a plurality of combinations, in such a manner as to achieve a required power to propel the vehicle while operating the first motor and the second motor individually at the highest electrical efficiency; and to operate the first motor and the second motor at the operating points of the selected combination.

In a non-limiting embodiment, the controller may be further configured: to select a combination of the operating points of the first motor and the second motor in which the power output of the first motor is largest, from a plurality of combinations of the operating points to achieve a required power to propel the vehicle while operating the first motor and the second motor individually at the highest electrical efficiency, to determine the operating point of the second motor based on the selected operating point of the first motor, and to operate the second motor at the determined operating point.

In a non-limiting embodiment, the controller may be further configured: to calculate an amount of change in the power output of any one of the first motor and the second motor when the estimated input torque is larger than the predetermined torque; to calculate an amount of change in the power output of the other motor based on the required power to propel the vehicle and the amount of change in the power output of said one of the motors; and to calculate the power output of the other motor based on the calculated amount of change in the power output of the other motor.

In a non-limiting embodiment, the controller may be further configured to: calculate the power output of any one of the first motor and the second motor when the estimated input torque is larger than the predetermined torque; and to calculate the power output of the other motor based on the required power to propel the vehicle and the calculated power output of the other motor.

In a non-limiting embodiment, the vehicle control system may further comprise: another prime mover in addition to the first motor and the second motor, and the rotary shaft may be connected to said another prime mover. In addition, the controller may be further configured to allow the rotary shaft to rotate by disengaging the locking mechanism when propelling the vehicle by delivering torque from said another prime mover to the drive wheels, and to stop the rotation of the rotary shaft by engaging the locking mechanism when propelling the vehicle by the first motor while stopping said another prime mover.

In a non-limiting embodiment, the locking mechanism may include a rotary member that is allowed to rotate relatively to the rotary shaft, a stationary member, a first engagement device that engages the rotary member with the stationary member, and a second engagement member that engages the rotary member with the rotary shaft. Specifically, the locking mechanism is adapted to stop the rotation of the rotary shaft by engaging the first engagement device and the second engagement device, and to disengage the first engagement device when the torque larger than the predetermined torque is applied to the rotary shaft.

In a non-limiting embodiment, the rotary member may be arranged to be opposed to the stationary member. The first engagement device may include first teeth protruding toward the stationary member, and the second engagement device may include second teeth protruding toward the rotary member. Specifically, a tooth thickness of each of the first teeth is thinned gradually toward the second teeth, and a tooth thickness of each of the second teeth is thinned gradually toward the first teeth.

In a non-limiting embodiment, an output shaft of the second motor may be connected to a gear, and the gear may be immersed into oil at least partially.

In the vehicle to which the control system according to the present disclosure is applied, the output torque of the first motor may be delivered to the drive wheels by stopping the rotation of the rotary shaft connected to one of the rotary elements of the differential mechanism by the locking mechanism, and the output torque of the second motor may also be delivered to the drive wheels. When an excessive torque is applied to the powertrain during propulsion by delivering torques of both motors to the drive wheels, the locking mechanism is disengaged to allow the rotary shaft to rotate. Consequently, the rotary members between the first motor and the drive wheels may be prevented from being subjected to the excessive torque thereby limiting damages on the rotary members.

Especially, when the vehicle is propelling on an uneven road surface, the input torque from the drive wheels may become excessive. In this situation, the power output of the first motor is increased and the power output of the second motor is decreased. Consequently, the percentage to receive the torque from the drive wheels by the rotary members between the first motor and the drive wheels may be increased, and the percentage to receive the torque from the drive wheels by the rotary members between the second motor and the drive wheels may be decreased. For this reason, rigidity of the rotary members between the second motor and the drive wheels may be reduced. That is, the rotary members between the second motor and the drive wheels may be downsized.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
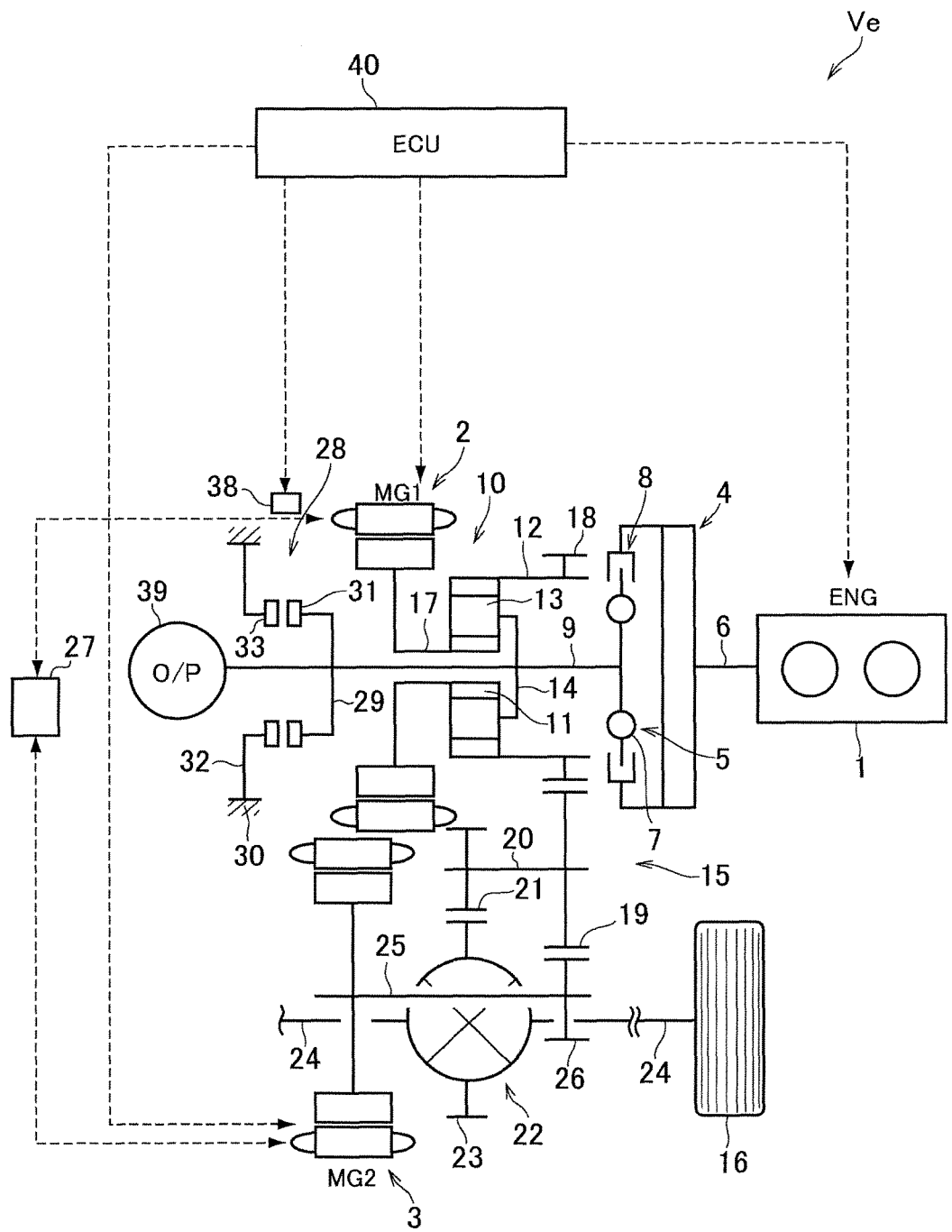
FIG. 1 is a schematic illustration showing one example of the vehicle to which the vehicle control system according to the embodiment is applied.

Preferred embodiments of the present application will now be explained with reference to the accompanying drawings. Referring now to FIG. 1, there is shown a first example of a vehicle Ve to which the vehicle control system according to the present application is applied. A prime mover of the vehicle Ve shown in FIG. 1 includes an engine (referred to as "ENG" in FIG. 1) 1 as a main prime mover, a first motor (referred to as "MG1" in FIG. 1) 2, and a second motor (referred to as "MG2" in FIG. 1) 3. As known in the art, the engine 1 is adapted to generate torque by combusting fuel, and pulsation of the torque is caused inevitably by combustion in cylinders of the engine. In order to absorb such torque pulse, a mass damper 4 and a spring damper 5 are disposed on an output shaft 6 of the engine 1. Specifically, the mass damper 4 is a conventional flywheel, and the spring damper 5 is adapted to transmit torque through coil springs 7 arranged in such a manner as to be compressed in a circumferential direction The mass damper 4 and the spring damper 5 are connected to each other through a torque limiter as a conventional frictional engagement device that slips when a torque larger than a predetermined magnitude is applied. An engagement force of the torque limiter 8 may be changed by a hydraulic actuator or an electromagnetic actuator. Alternatively, an engagement force of the torque limiter 8 may also be established by bringing an input member of the spring damper 5 into contact to the mass damper 4 by a spring or the like.

One of end portions of an input shaft 9 as a rotary shaft is connected to the spring damper 5 so that torque of the engine 1 is delivered to the input shaft 9 through the mass damper 4, the torque limiter 8 and the spring damper 5. A power split device 10 as a differential mechanism is fitted onto the input shaft 9. According to the embodiment, a single-pinion planetary gear unit is used as the power split device 10, and the power split device 10 comprises a sun gear 11 fitted onto the input shaft 9, a ring gear 12 as an internal gear arranged concentrically with the sun gear 11, a plurality of pinion gears 13 interposed between the sun gear 11 and the ring gear 12, and a carrier 14 supporting the pinion gears 13 in a rotatable manner. In the hybrid vehicle Ve shown in FIG. 1, accordingly, the sun gear 11 serves as a first rotary element, the ring gear 12 serves as a second rotary element, and the carrier 14 serves as a third rotary element.

The carrier 14 is connected to the input shaft 9, the sun gear 11 is connected to a first motor 2 disposed on an opposite side of the engine 1 across the power split device 10, and the ring gear 12 is connected to drive wheels 16 through a gear train 15. When delivering drive force generated by the engine 1 to the drive wheels 16 in the hybrid vehicle Ve shown in FIG. 1, the carrier 14 serves as an input element, the sun gear 11 serves as a reaction element, and the ring gear 12 serves as an output element. An output shaft 17 of the first motor 17 is a hollow shaft, and the input shaft 9 is inserted into the output shaft 17 while being allowed to rotate relatively thereto.

For example, in the hybrid vehicle Ve shown in FIG. 1, a permanent magnet type synchronous motor having a generating function may be used as the first motor 2.

An external output gear 18 as an external gear is integrally formed around the ring gear 12, and a countershaft 20 is arranged in parallel with the input shaft 9. A counter driven gear 19 is fitted onto one end of the countershaft 20 while being meshed with the output gear 18, and a counter pinion gear 21 that is diametrically smaller than the counter driven gear 19 is fitted onto the other end of the countershaft 20 while being meshed with a ring gear 23 of a deferential gear unit 22. The deferential gear unit 22 is connected to the drive wheels 16 through drive shafts 24.

The second motor 3 is connected to the counter driven gear 19. Specifically, an output gear 26 is fitted onto a leading end of an output shaft 25 while being meshed with the counter driven gear 19. A permanent magnet type synchronous motor having a generating function may also be used as the second motor 3. A lower portion of the output gear 26 is immersed into oil held in an oil pan (not shown) so that the oil is splashed by a rotation of the second motor 3 to be applied to slidable members and heat generating members such as gears.

The first motor 2 and the second motor 3 are electrically connected to a battery 27, and an electricity generated by one of the motors 2 and 3 can be supplied to the other motor 2 or 3 without passing through the battery 27.

In order to restrict a rotation of the input shaft 9, a locking mechanism is disposed on the input shaft 9 in an opposite side of the engine 1 across the power split device 10.

Figure 2:
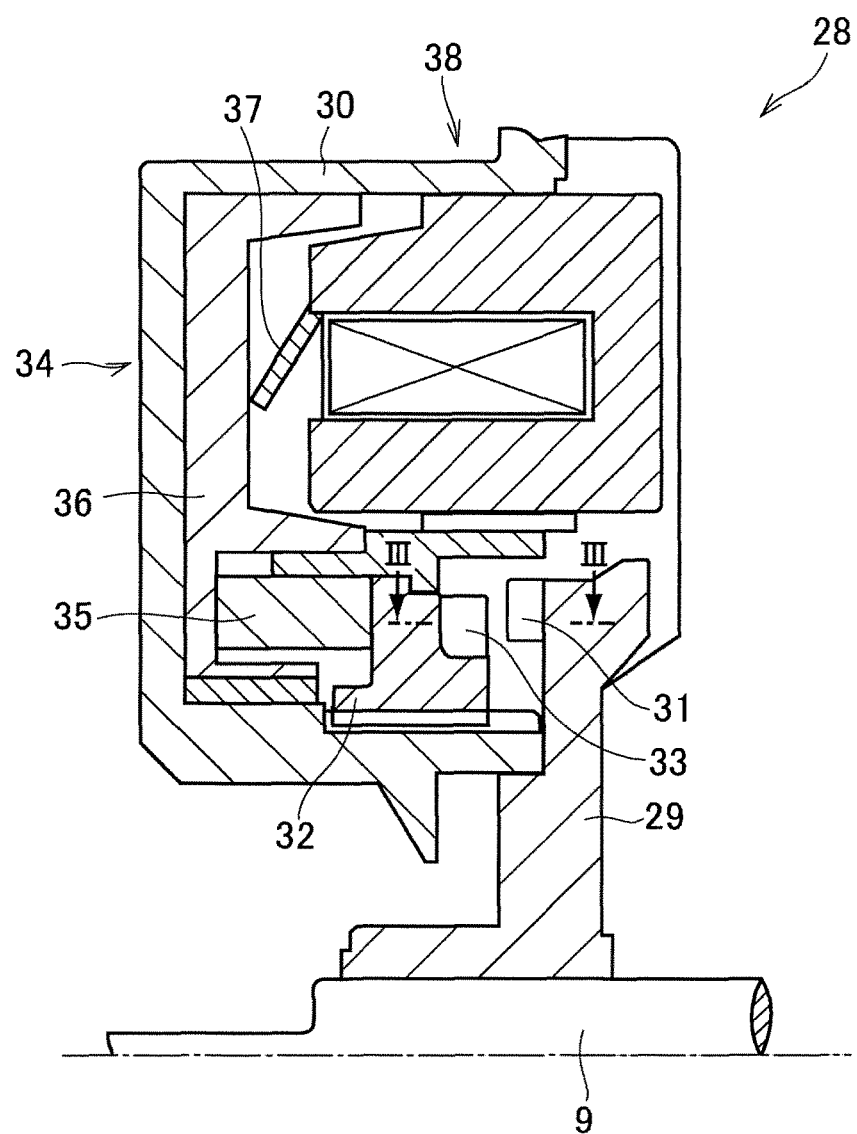
FIG. 2 is a cross-sectional view showing a structure of the locking mechanism.

A structure of the locking mechanism 28 is shown in FIG. 2. The locking mechanism 28 is adapted to restrict the rotation of the input shaft 9 by engaging a first rotary member 29 as a rotary member fitted onto the input shaft 9 with a casing 30, and the first rotary member 29 is disengaged from the casing 30 when a torque larger than a predetermined magnitude is applied to the input shaft 9. Thus, the locking mechanism 28 serves not only as a stopper to stop the rotation of the input shaft 9 but also as a torque limiter to limit the torque applied to the input shaft 9.

Specifically, the first rotary member 29 is an annular member fitted onto the input shaft 9. A plurality of first dog teeth 31 are formed on an outer circumferential portion of the first rotary member 29 at regular intervals in such a manner as to protrude toward a below-mentioned pushing mechanism 40. An annular first movable member 32 as a fixed member is splined onto an inner circumferential portion of the casing 30, and a plurality of second dog teeth 33 are formed on the first movable member 32 to be engaged with the first dog teeth 31.

The pushing mechanism 40 is adapted to push the first movable member 32 in an axial direction. To this end, the pushing mechanism 40 is provided with a compression spring 35 that pushes the first movable member 32 toward the first rotary member 29 from behind, an annular second movable member 36 that compresses the compression spring 35 between the second movable member 36 itself and the first movable member 29, a diaphragm spring 37 that applies an elastic force to the second movable member 36 in a direction away from the first rotary member 29, and an electromagnetic actuator 38 that generates an electromagnetic force when energized.

The second movable member 36 is made of magnetic material so that the electromagnetic force acts on the second movable member 36 when the electromagnetic actuator 38 to counteract to the elastic force of the diaphragm spring 37. Then, when the electromagnetic force of the electromagnetic actuator 38 overwhelms the elastic force of the diaphragm spring 37, the second movable member 36 is attracted toward the first movable member 32. In this situation, the first movable member 32 is free from a load to be isolated away from the first rotary member 29, and hence the compression spring 35 is not compressed. That is, a load derived from the electromagnetic force of the electromagnetic actuator 38 is applied to the first movable member 32 through the compression spring 35 while being damped by the electric force of the diaphragm spring 35. Consequently, the first movable member 32 is pushed toward the first rotary member 29 so that the second dog teeth 33 are engaged with the first dog teeth 31. In this situation, if leading ends of the second dog teeth 33 are brought into abutment with leading ends of the first dog teeth 31, the compression spring 35 is compressed to reduce a friction acting between leading ends of the second dog teeth 33 and the first dog teeth 31 to allow the first rotary member 29 to rotate slightly so that the second dog teeth 33 can be engaged with the first dog teeth 31 completely.

Consequently, the input shaft 9 is engaged with the casing 30 to stop the rotation of the input shaft 9. Thus, the locking mechanism 28 is an engagement mechanism adapted to selectively stop the rotation of the input shaft 9 by controlling the electromagnetic actuator 38.

Figure 3:
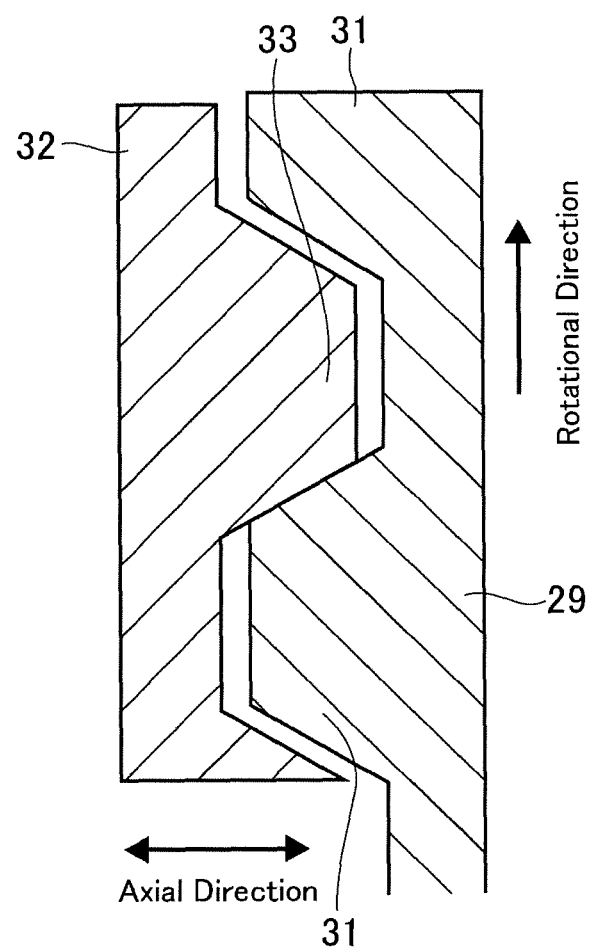
FIG. 3 is a cross-sectional view of the locking mechanism along III-III line in FIG. 2.

Specifically, as illustrated in FIG. 3, a tooth thickness of each of the first dog teeth 31 is individually reduced toward the second dog teeth 33. That is, a cross-sectional shape of each of the first dog teeth 31 is trapezoidal. Likewise, a tooth thickness of each of the second dog teeth 33 is individually reduced toward the first dog teeth 31. That is, a cross-sectional shape of each of the second dog teeth 33 is also trapezoidal.

As explained, when the second dog teeth 33 are engaged with the first dog teeth 31, the load derived from the electromagnetic force of the electromagnetic actuator 38 is applied to the first movable member 32 while being damped by the electric force of the diaphragm spring 35. In this situation, when a torque is applied to the input shaft 9, a thrust force that is governed by a magnitude of the torque and inclination of tooth flanks of the first dog teeth 31 and the second dog teeth 33, is applied to the first movable member 32 in the direction to isolate the first movable member 32 away from the first movable member 29.

The compression spring 35 is prevented from being compressed by the second movable member 36 when transmitting torque by engaging the second dog teeth 33 with the first dog teeth 31. To this end, a projection (not shown) having a contact face inclined with respect to the axial direction is formed on the second movable member 36 to protrude toward the first movable member 32, and another projection (not shown) also having a contact face inclined with respect to the axial direction is formed on the first movable member 32 to protrude toward the second movable member 36. In the locking mechanism 38, therefore, the projection of the second movable member 36 is brought into contact with another projection of the first movable member 32 by a load applied to the first movable member 32 from the first rotary member 29. Consequently, the load applied to the first movable member 32 is translated into a circumferential load by the contact faces of the projections, and hence the compression spring 35 can be prevented from being compressed.

Thus, in the locking mechanism 38, engagement between the first dog teeth 31 and the second dog teeth 33 is maintained to restrict the rotation of the input shaft 9 as long as the pushing load applied to the first movable member 32 overwhelms the torque applied to the input shaft 9. By contrast, when the torque applied to the input shaft 9 overwhelms the pushing load applied to the first movable member 32, the second dog teeth 33 is disengaged from the first dog teeth 31 thereby allowing the input shaft 9 to rotate. That is, an upper limit torque applied to the input shaft 9 that is possible to maintain the engagement between the first dog teeth 31 and the second dog teeth 33 can be determined by an electric power supplied to the electromagnetic actuator 38 to generate the pushing force for pushing the first movable member 32 toward the first rotary member 29. Accordingly, the upper limit torque applied to the input shaft 9 corresponds to the "predetermined torque" of the present application.

A leading end of the input shaft 9 is connected to a mechanical oil pump (referred to as O/P in FIG. 1) 39 that discharges oil to lubricate and cool the motors 2, 3 and gears, and that generates oil pressure applied to a hydraulic actuator (not shown). In addition, an electric oil pump (not shown) is also arranged in the hybrid vehicle Ve to discharge the lubrication oil and to generate oil pressure when the mechanical oil pump 39 is inactivated during cessation of engine operation.

In order to control the engine 1, the motors 2, 3, the electromagnetic actuator 38 and so on, the hybrid vehicle Ve is provided with an electronic control unit (to be abbreviated as the "ECU" hereinafter) 40 as a controller. The ECU 40 is composed mainly of a microcomputer that is configured to execute calculation based on data installed in advance and incident data about a position of an accelerator pedal, a vehicle speed, a state of charge (to be abbreviated as the "SOC" hereinafter) of the battery 27, speeds and torques of rotary members of the gear train 15 etc., and to transmit calculation results in the form of torque commands to the engine 1, the first motor 2 and the second motor 3, and a current command to the electromagnetic actuator 38 and so on. Optionally, a plurality of the ECU 40 may be arranged in the hybrid vehicle according to need.

An operating mode of the hybrid vehicle Ve may be selected from hybrid vehicle mode in which the hybrid vehicle Ve is powered mainly by the engine 1, single electric vehicle mode in which the hybrid vehicle Ve is powered by the first motor 2 while stopping the engine 1, and dual electric vehicle mode in which the hybrid vehicle Ve is powered by both of the first motor 2 and the second motor 3 while stopping the engine 1. In the following explanation, the hybrid vehicle mode will be called the "HV mode", and the single electric vehicle mode and the dual electric vehicle mode will be called the "EV mode".

In the HV mode, the engine 1 generates required power to achieve a required drive force governed by a position of the accelerator pedal. The required power of the engine 1 may be calculated by adding power for operating the first motor 2 and second motor 3 to charge the battery 27 and power for driving the oil pump 39, and subtracting electric power supplied from the battery 27 to the first motor 2 and second motor 3.

When transmitting the output power of the engine 1 to the drive wheels 16 through the power split device 10, the first motor 2 establishes a reaction torque. In this situation, given that the first motor 2 establishes the reaction torque in such a manner that a rotational speed of the sun gear 11 is reduced, the output power of the engine 1 is partially converted into electric energy by the first motor 2. That is, the first motor 2 serves as a generator. At the same time, the remaining output power of the engine 1 is outputted from the ring gear 12. Thus, the output power of the engine 1 is distributed to the first motor 2 and to the ring gear 12 through the power split device 10.

A speed of the first motor 2 is controlled in such a manner as to optimize fuel efficiency of the engine 1. Specifically, a target speed of the engine 1 is determined based on a required power of the engine 1 in line with a fuel efficient curve, and the speed of the first motor is controlled in such a manner as to achieve the target speed of the engine 1.

The electricity generated by the first motor 2 is supplied to the second motor 3 directly or through the battery 27 to generate power by the second motor 3. The output power of the second motor 3 is added to the power from the power split device 10 and delivered to the drive wheels 16. The electricity stored in the battery 27 may also be supplied to the second motor 3 in addition to the electricity generated by the first motor 2, and the electricity generated by the first motor 2 may be stored partially in the battery 27.

In the single EV mode, the second motor 3 is operated by the electricity supplied from the battery 27 to propel the hybrid vehicle Ve while stopping fuel supply to the engine 1. In this case, the engine 1 may be not only halted while allowing the first motor 2 to rotate passively, but also allowed to rotate passively while stopping a rotation of the first motor 2.

In the ingle EV mode, since the hybrid vehicle Ve is powered only by the second motor 3, the available power to propel the hybrid vehicle Ve is limited. When a required drive force is larger than the maximum output of the second motor 3, the operating mode is shifted to the dual EV mode in which the hybrid vehicle Ve is powered by both of the first motor 2 and the second motor 3. In the dual EV mode, the first motor 2 also generates drive torque while stopping the engine 1, and the rotation of the input shaft 9 is restricted by engaging the locking mechanism 28 to output the drive torque of the first motor 2 from the ring gear 12.

When the first motor 2 generates the drove torque while engaging the locking mechanism 28 to restrict the rotation of the input shaft 9, the carrier 14 establishes a reaction force so that the torque of the first motor 2 is delivered to the ring gear 12. In this situation, the torque of the second motor 3 is delivered to the drive wheels 16 in addition to the torque of the first motor 2 delivered through the ring gear 12.

In the dual EV mode, a ratio of the powers to be generated by the first motor 2 and the second motor 3 to achieve the required drive force may be changed arbitrarily. For example, when propelling on a flat road in the dual EV mode, it is preferable to control the first motor 2 and the second motor 3 in such a manner as to reduce electric consumption.

By contrast, when propelling on an uneven road surface or a bumpy road in the dual EV mode, torque may be applied from the drive wheels 16. In this situation, the rotary members interposed between the drive wheels 16 and the first motor 2 and between the drive wheels 16 and the second motor 3 are subjected to the torque delivered from the drive wheels 16 in addition to the torques delivered from the first motor 2 and the second motor 3, in accordance with the ratio of the power generated by the first motor 2 and the second motor 3. In order to prevent the rotary members from being damaged by the torque applied from the drive wheels 16, the ratio of the powers to be generated by the first motor 2 and the second motor 3 may be altered by the following procedure shown in FIG. 4.

Figure 4:
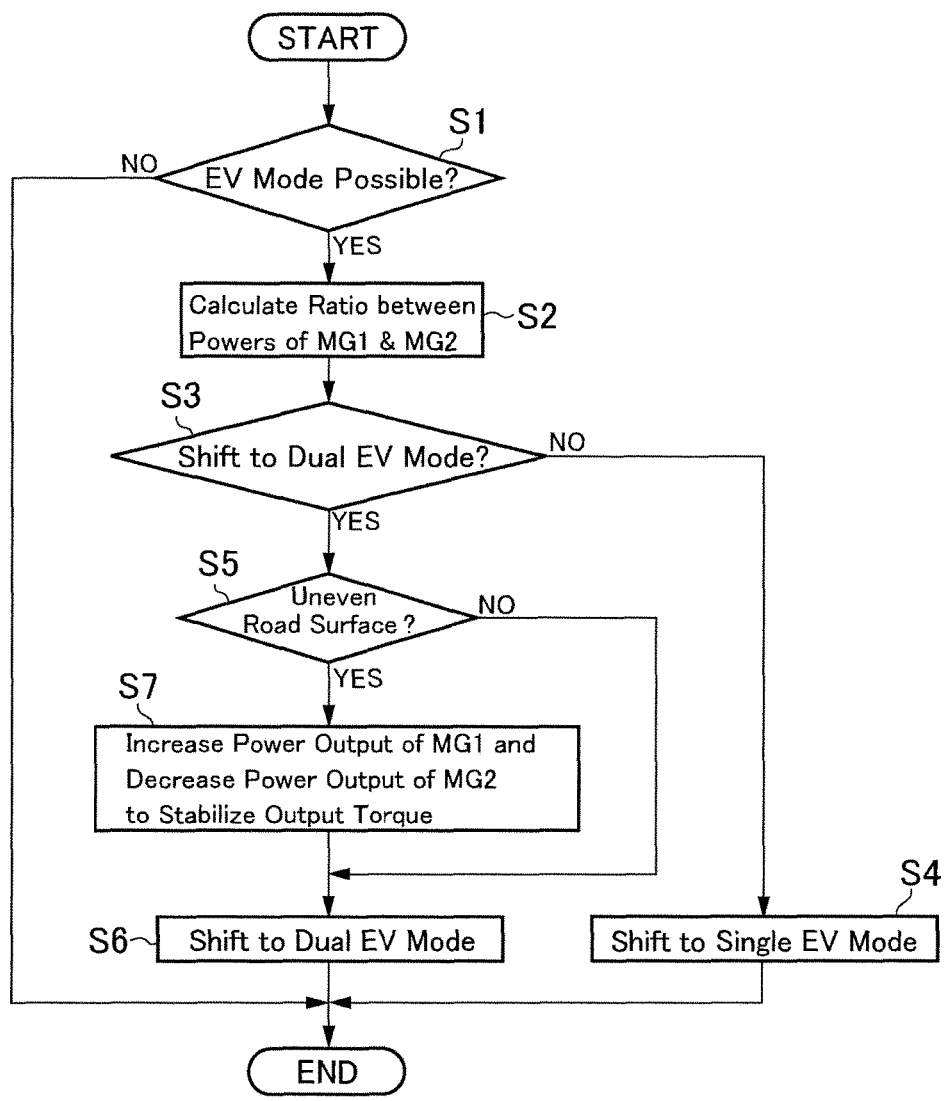
FIG. 4 is a flowchart showing a control executed by the vehicle control system.

The routine shown in FIG. 4 is executed by the ECU 40. First of all, an availability of the EV mode is determined at step S1. Specifically, it is determined whether or not the hybrid vehicle Ve can be propelled in the single EV mode or the dual EV mode while stopping the engine 1, based on a state of charge of the battery 27, a position of the accelerator pedal and so on.

If the EV mode is not available so that the answer of step S1 is NO, the routine is returned. By contrast, if the EV mode is available so that the answer of step S1 is YES, the routine progresses to step S2 to calculate the ratio of the powers to be generated by the first motor 2 and the second motor 3. At step S2, in a case that the required drive force to be delivered to the drive wheels 16 can be achieved in the single EV mode, the power to be generated by the first motor 2 is set to "zero". By contrast, in a case that the required drive force to be delivered to the drive wheels 16 cannot be achieved in the single EV mode, the ratio of the powers to be generated by the first motor 2 and the second motor 3 is determined in such a manner as to increase a total electrical efficiency to the highest efficiency. Specifically, the electrical efficiency of the first motor 2 is calculated by dividing a useful power output of the first motor 2 by a power input from the battery 27. Likewise, the electrical efficiency of the second motor 3 is calculated by dividing a useful power output of the second motor 3 by a power input from the battery 27. That is, the total electrical efficiency is calculated by dividing a total amount of the power outputs of the first motor 2 and the second motor 3 by a total power input from the battery 27. In this case, since power losses of the first motor 2 and the second motor 3 resulting from an iron loss and a copper loss are different depending on operating points, the ratio of the powers to be generated by the first motor 2 and the second motor 3 is adjusted to increase the total electrical efficiency.

The electrical efficiency of the first motor 2 with respect to the operating point thereof and the electrical efficiency of the second motor 3 with respect to the operating point thereof are installed in the ECU 40 in the form of maps or the like. If a plurality of the operating points of the first motor 2 and the second motor 3 at which the total electrical efficiency can be increased are available, the operating points of the first motor 2 and the second motor 3 are selected in such a manner as to increase the power output of the second motor 3. Consequently, a change in the power output of the second motor 3 can be reduced in the event of shifting from the dual EV mode to the single EV mode, while splashing the oil by the output gear 26.

Then, the routine progresses to step S3 to determine need to shift the operating mode to the duel EV mode. At step S3, specifically, it is determined whether or not the required drive force cannot be achieved in the single EV mode. Alternatively, the operating mode may also be shifted from the single EV mode to the dual EV mode when a temperature of the second motor 3 is raised higher than a predetermined temperature to allow the second motor 3 to be cooled in the dual EV mode.

If it is not necessary to shift the operating mode to the dual EV mode so that the answer of step S3 is NO, the routine progresses to step S4 to propel the hybrid vehicle Ve only by the second motor 3 in the single EV mode, and then returned. That is, the required drive force is generated only by the second motor 3, and in this situation, the first motor 2 will not generate the drive force.

By contrast, if it is necessary to shift the operating mode to the dual EV mode so that the answer of step S3 is YES, the routine progresses to step S5 to determine whether or not unevenness of the road surface is detected on a road on which the hybrid vehicle Ve is currently travelling or on a planned route on which the hybrid vehicle Ve is going to travel. Specifically, unevenness of the surface of the road on which the hybrid vehicle Ve is currently travelling may be detected based on a fact that a change rate of a rotational speed of the drive wheel 16 or a predetermined rotary member in the powertrain is greater than a predetermined value. Alternatively, unevenness of the surface of the road on which the hybrid vehicle Ve is currently travelling may also be detected based on a fact that a difference between: an actual torque applied to the predetermined rotary member; and an expected torque applied to the predetermined rotary member calculated based on output torques of the first motor 2 and the second motor 3, is greater than a predetermined value. On the other hand, unevenness of the surface of the planned route on which the hybrid vehicle Ve is going to travel may be detected with reference to a map installed in a navigation system or the like.

That is, application of an excessive torque to the rotary members in the powertrain caused by pulsation of the torque delivered from the drive wheels 16 is determined at step S5. Accordingly, the determination at step S5 may also be made based on a fact that the torque applied from the drive wheels 16 is larger than a predetermined value. For example the torque applied from the drive wheels 16 may be calculated based on a change rate (or an angular velocity) of the drive wheel 16 or the predetermined rotary member in the powertrain, and an inertia moment governed by a mass of a rotary member disposed in an output side of the driveshaft. Thus, at step S5, it is determined whether or not the hybrid vehicle Ve is currently travelling or going to travel on the uneven road surface on which the torque applied from the drive wheels 16 is larger than the predetermined value.

Instead, at step S5, it is also possible to determine existence of bumps or steps on the road on which the hybrid vehicle Ve is currently travelling or going to travel. In addition, if a road surface friction is small, pulsation of the torque applied from the drive wheels 16 may also be caused by a repetition of temporal slippage of the drive wheels 16. Therefore, the determination at step S5 may also be made based on a fact that the road surface friction is smaller than a predetermined value.

If the road surface is not uneven so that the answer of step S5 is NO, the routine progresses to step S6 to propel the hybrid vehicle Ve in the dual EV mode while operating the first motor 2 and the second motor 3 based on the ratio of the powers calculated at step S2, and then the routine is returned.

By contrast, if unevenness of the road surface is detected so that the answer of step S5 is YES, the routine progresses to step S7 to stabilize the torque delivered to the drive wheels 16 (i.e., the output torque) by increasing the power output of the first motor 2 calculated at step S2 while decreasing the power output of the second motor 3 calculated at step S2 within a range where the required drive force to propel the hybrid vehicle Ve can be achieved. Then, the routine progresses to step S6 to propel the hybrid vehicle Ve in the dual EV mode while operating the first motor 2 and the second motor 3 based on the ratio of the powers calculated at step S7.

At step S7, for example, an amount of increase in the power output of the first motor 2 is calculated first of all, and an amount of decrease in the power output of the second motor 3 is calculated based on the amount of increase in the power output of the first motor 2. Then, the power output of the first motor 2 to propel the hybrid vehicle Ve on the uneven road surface is determined based in the amount of increase in the power output of the first motor 2. Alternatively, the power output of the first motor 2 may also be determined based on the increased power output of the first motor 2 and the required drive force to propel the hybrid vehicle Ve.

During propulsion in the dual EV mode, a speed ratio between the first motor 2 and the drive wheels 16, and a speed ratio between the second motor 3 and the drive wheels 16 are constant. That is, an output torque of the first motor 2 is increased to increase the power output thereof, an output torque of the second motor 3 is increased to increase the power output thereof. In this situation, therefore, an amount of change (i.e., a change rate) in the torque is governed by a ratio between: the speed ratio between the first motor 2 and the drive wheels 16; and the speed ratio between the second motor 3 and the drive wheels 16.

As a result of thus increasing the power output of the first motor 2, the first motor 2 and the power split device 10 may be heated. In order to prevent the first motor 2 and the power split device 10 from being heated excessively, at step S7, the ratio of the powers to be generated by the first motor 2 and the second motor 3 may be adjusted taking account of amounts of heat generation of the first motor 2 and the power split device 10, and a splashing amount of the oil by the output gear 26 or a discharging amount of the oil from the electric oil pump.

Figure 5:
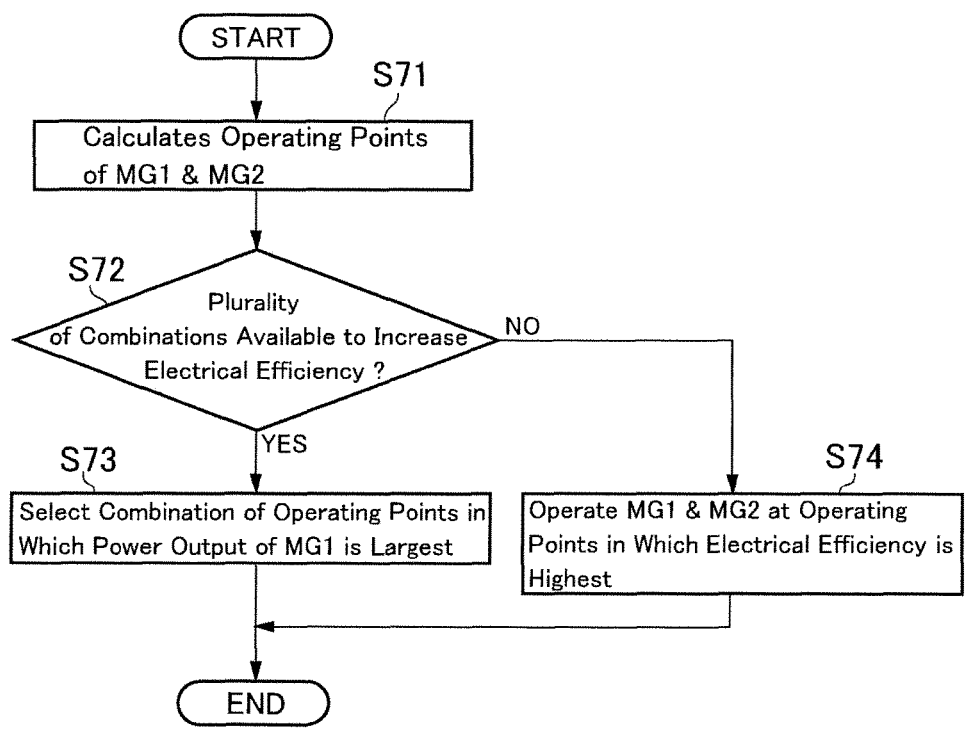
FIG. 5 is a flowchart showing a procedure for determining ratio of the power outputs between the first motor and the second motor when an uneven road surface is detected.

FIG. 5 shows a subroutine of step S7 to adjust the ratio of the powers to be generated by the first motor 2 and the second motor 3 in such a manner as to optimize electric efficiencies of the first motor 2 and the second motor 3. At step S71, an operating point(s) of the first motor 2 is/are determined to increase the power output of the first motor 2 calculated at step S2 in such a manner as to achieve the required drive force to propel the hybrid vehicle Ve while stabilizing the torque delivered to the drive wheels 16, and an operating point(s) of the second motor 3 is/are determined to decrease the power output of the second motor 3 calculated at step S2 in such a manner as to achieve the required drive force to propel the hybrid vehicle Ve while stabilizing the torque delivered to the drive wheels 16. Since the capacities and specification of the first motor 2 and the second motor 3 are different, a plurality of combinations of the operating points of the first motor 2 and the second motor 3 are available in the dual EV mode to achieve the required drive force to propel the hybrid vehicle Ve while stabilizing the torque delivered to the drive wheels 16.

Then, the routine progresses to step S72 to determine whether or not a plurality of combinations of the operating points are available in the calculation results of step S71 to operate the first motor 2 and the second motor 3 at the highest electrical efficiency. In other words, it is determined whether or not a plurality of combinations of the operating points to optimize the total electrical efficiency are available.

If a plurality of combinations of the operating points are available to operate the first motor 2 and the second motor 3 at the highest electrical efficiency so that the answer of step S72 is YES, the routine progresses to step S73 to select the combination of the operating points in which the power output of the first motor 2 is largest, and then the routine is returned. For example, if the total electrical efficiency of the first motor 2 and the second motor 3 can be increased to the highest efficiency not only by generating 50% of the total required power by the first motor 2 but also by generating 70% of the total required power by the first motor 2, the combination of the operating points in which the first motor 2 generates 70% of the total required power is selected. Then, the required power output of the second motor 3 to achieve the total required power is determined based on the power output of the of the first motor 2 thus determined.

By contrast, if only one combination of the operating points is available to operate the first motor 2 and the second motor 3 at the highest electrical efficiency so that the answer of step S72 is NO, the routine progresses to step S74 to operate the first motor 2 and the second motor 3 at the available operating points, and then the routine is returned.

Figure 6:
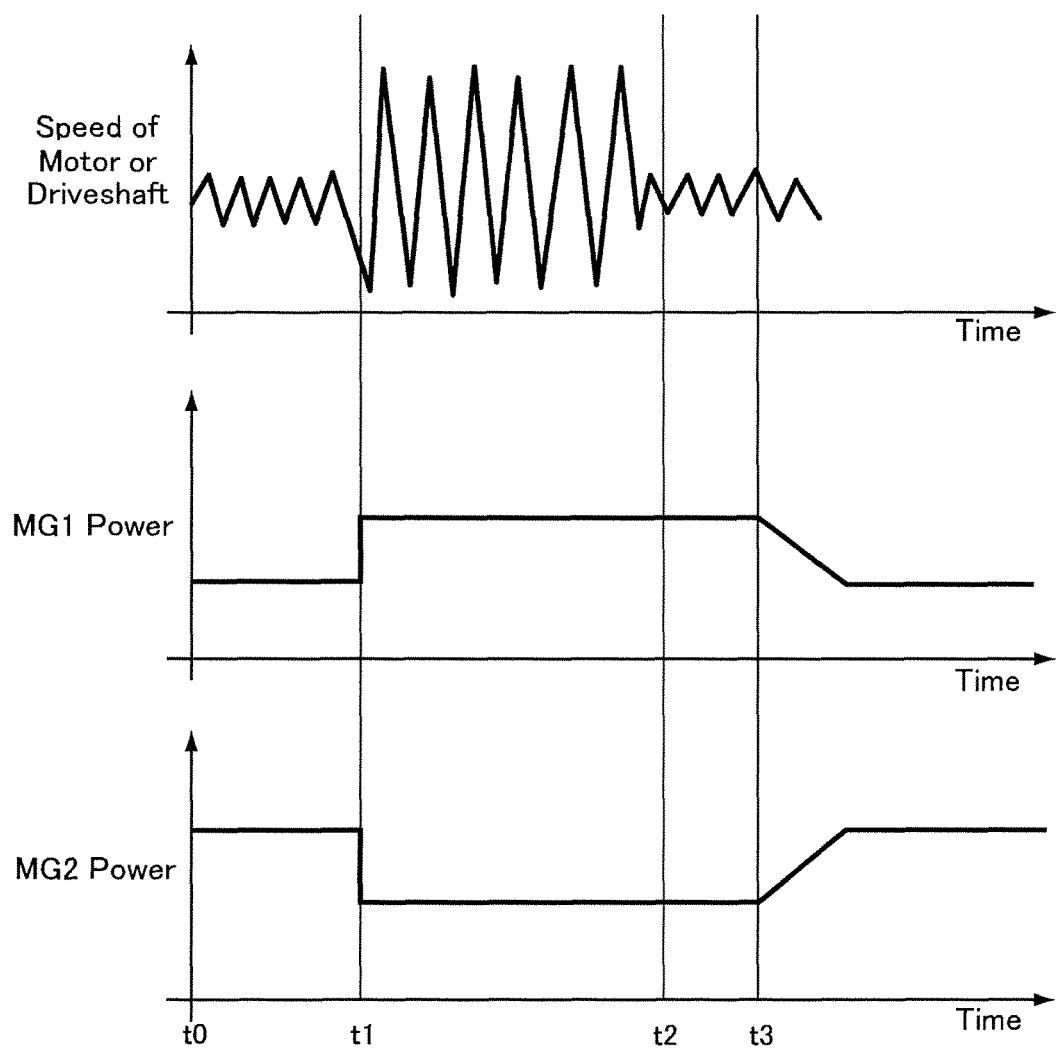
FIG. 6 is a time chart showing changes in power of the each of the motors during execution of the control shown in FIG. 1.

Changes in the power outputs of the first motor 2 and the second motor 3, and a speed of any one of the first motor 2 and the second motor 3 or the driveshaft 24 during execution of the control shown in FIG. 4 are indicated in FIG. 6. From point t0 to point t1, the hybrid vehicle Ve is propelled on a flat road while keeping powers of the first motor 2 and the second motor 3 constant, and hence rotational speeds of the first motor 2, the second motor 3 and the driveshaft 24 are rotated at substantially constant speeds. In this situation, unevenness of the road surface is not detected at step S5 of the routine shown in FIG. 4, and the first motor 2 and the second motor 3 are operated based on the ratio of the powers calculated at step S2 to increase the total electrical efficiency.

At point t1, unevenness of the road surface is detected and hence the amount of change in fluctuation of the speed of the first motor 2, the second motor 3 or the driveshaft 24 is increased due to change in friction between the road surface and the drive wheels 16, vertical force at the drive wheels 16 and slip rate of the drive wheels 16. In this situation, the power output of the first motor 2 is increased and the power output of the second motor 3 is decreased in such a manner as to achieve the required drive force to propel the hybrid vehicle Ve while stabilizing the torque delivered to the drive wheels 16.

When the fluctuation of the speed of the first motor 2, the second motor 3 or the driveshaft 24 is reduced at point t2 to a level of the case in which the hybrid vehicle Ve propels on the flat road, a timer is started to determine whether or not the road surface becomes flat only temporarily. In this situation, therefore, the power output of the first motor 2 is still increased and the power output of the second motor 3 is still decreased.

Then, when a predetermine period of time has elapsed from point t2, a determination of the flat road surface is made at point t3. The predetermined period of time is set to a length possible to determine that the fluctuation of the speed of the first motor 2, the second motor 3 or the driveshaft 24 is stabilized as that of the case in which the hybrid vehicle propels on the flat road, and installed in the ECU 40. In this situation, the power outputs of the first motor 2 and the second motor 3 are returned to those calculated at step S2 in such a manner as not to change the drive force.

Thus, when the large torque is applied to the powertrain from the drive wheels 16 during propulsion in the EV mode, the percentage to receive the torque from the drive wheels 16 by the rotary members between the first motor 2 and the drive wheels 16 can be increased by increasing the power output of the first motor 2 while decreasing the power output of the second motor 3. In other words, the percentage to receive the torque from the drive wheels 16 by the rotary members between the second motor 3 and the drive wheels 16 can be decreased. For this reason, rigidity of the rotary members between the second motor 3 and the drive wheels 16 can be reduced. That is, the rotary members between the second motor 3 and the drive wheels 16 can be downsized.

When an excessive torque applied to the powertrain from the drive wheels 16, the rotary members between the first motor 2 and the drive wheels 16 can be prevented from being subjected to the torque applied from the drive wheels 16 by disengaging the locking device 28. For this reason, it is not necessary to enhance rigidity of the rotary members between the first motor 2 and the drive wheels 16. That is, the rotary members between the first motor 2 and the drive wheels 16 may also be downsized.

In addition, since the ratio of the powers to be generated by the first motor 2 and the second motor 3 to achieve the required power to propel the hybrid vehicle Ve is adjustable, temporal drop in the drive force and resultant deterioration of acceleration can be avoided.

Further the ratio of the powers to be generated by the first motor 2 and the second motor 3 to achieve the required power to propel the hybrid vehicle Ve can be adjusted in such a manner as to increase the electrical efficiencies of the first motor 2 and the second motor 3.

The structure of the locking mechanism 28 should not be limited to that shown in FIGS. 1 to 3. For example, a conventional friction engagement device (i.e., a brake) in which a torque transmitting capacity is controlled by a hydraulic actuator or an electromagnetic actuator may also be used as the locking mechanism 28. Alternatively, as shown in FIG. 7, the locking mechanism 28 may also be formed of a dog clutch 41 serving only as a locking function, and a frictional engagement device 42 serving only as a torque limiter.

Figure 7:
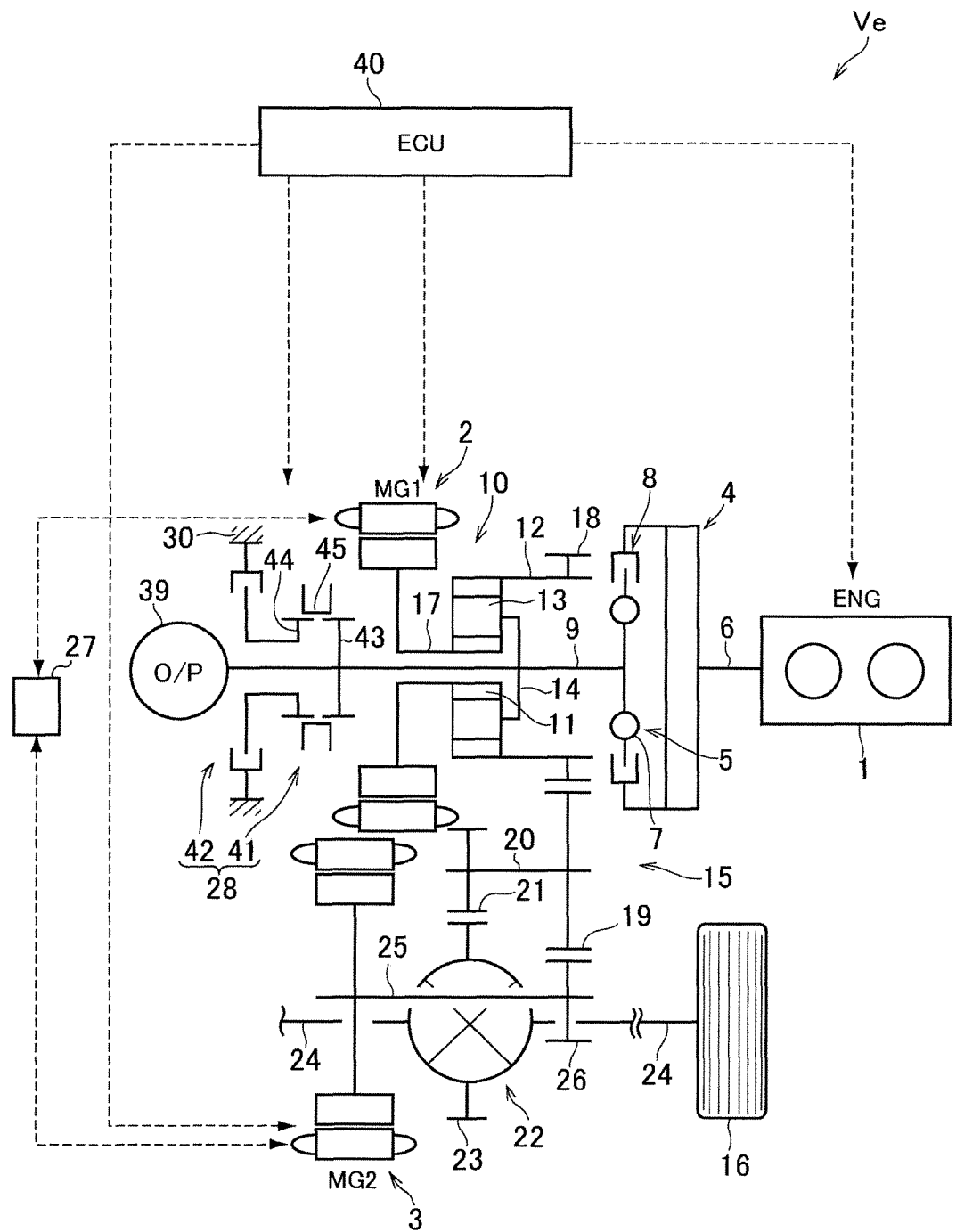
FIG. 7 is a schematic illustration showing another example of the vehicle in which two engagement devices are used to form the locking mechanism.

FIG. 7 shows a hybrid vehicle Ve provided with the locking mechanism 28 including the dog clutch 41 and the frictional engagement device 42. The remaining structures are similar to those of the hybrid vehicle Ve shown in FIG. 1, and detailed explanations for the common elements will be omitted by allotting common reference numerals thereto. The dog clutch 41 comprises: a second rotary member 43 having external teeth that is fitted onto the input shaft 9; a third rotary element 44 having external teeth that is fitted onto the input shaft 9 while being adjacent to the second rotary member 43 and allowed to rotate relatively to the second rotary member 43; and a sleeve 45 having internal teeth that is fitted onto the second rotary member 43 and the third rotary element 44 in a slidable manner. When the sleeve 45 is moved by an actuator (not shown) to a position to be engaged with the second rotary member 43 and the third rotary element 44, the second rotary member 43 and the third rotary element 44 are connected to each other through the sleeve 45. By contrast, when the sleeve 45 is moved by the actuator to a position to be disengaged from one of the second rotary member 43 and the third rotary element 44, the second rotary member 43 and the third rotary element 44 are disconnected from each other and allowed to rotate relatively to each other. In the example shown in FIG. 7, the third rotary member 44 serves as a "rotary member", and the dog clutch 41 serves as a "second engagement device".

The third rotary member 44 is connected to the casing 30 through the frictional engagement device 42 as a torque limiter. That is, a rotation of the third rotary member 44 is stopped by engaging the frictional engagement device 42. Specifically, the frictional engagement device 42 is adapted to transmit torque in accordance with a thrust force established by an actuator or an elastic member (neither of which are shown). In other words, the frictional engagement device 42 will not transmit the torque larger than the thrust force. That is, the torque to stop the rotation of the third rotary member 44 is restricted. In the example shown in FIG. 7, the casing 30 serves as a "stationary member", and the frictional engagement device 42 serves as a "first engagement device".

In the hybrid vehicle Ve shown in FIG. 7, the rotation of the input shaft 9 may also be stopped by engaging the second rotary member 43 with the third rotary element 44 by the sleeve 45 given that the torque of the input shaft 9 is smaller than the torque transmitting capacity of the frictional engagement device 42. When the torque of the input shaft 9 exceeds the torque transmitting capacity of the frictional engagement device 42, the frictional engagement device 42 starts slipping. Thus, as in the hybrid vehicle Ve shown in FIG. 1, the locking mechanism 28 is disengaged to allow the input shaft 9 to rotate when the excessive torque is applied from the drive wheels 16 during propulsion in the dual EV mode. According to the example shown in FIG. 7, therefore, the rotary embers between the first motor 2 and the drive wheels 16 can be prevented from being subjected to the excessive torque. That is, in the hybrid vehicle Ve shown in FIG. 7, the advantages of the hybrid vehicle Ve shown in FIG. 1 may also be achieved by carrying out the routine shown in FIG. 4.

Although the above exemplary embodiments of the present application have been described, it will be understood by those skilled in the art that the present application should not be limited to the described exemplary embodiments, and various changes and modifications can be made within the spirit and scope of the present application. For example, the first motor 2 and the second motor 3 may also be arranged coaxially. In addition, the vehicle control system according to the embodiment may also be applied to an electric vehicle provided with another motor instead of the engine.

What is claimed is:

1. A vehicle control system, comprising:
    a first motor;
    a differential mechanism including a first rotary element connected to the first motor, a second rotary element connected to drive wheels, and a third rotary element connected to a rotary shaft;
    a second motor that applies a drive force to a power transmitting route between the differential mechanism and the drive wheels;
    a locking mechanism that selectively stops a rotation of the rotary shaft; and
    a controller that controls power outputs of the first motor and the second motor,
    wherein the locking mechanism is adapted to keep stopping the rotation of the rotary shaft when a torque of the rotary shaft is smaller than a predetermined torque, and to allow the rotary shaft to rotate when the torque of the rotary shaft is larger than a predetermined torque, and
    wherein the controller is configured to
        estimate an input torque from the drive wheels based on a condition of a road on which the vehicle is currently travelling or on a planned route on which the vehicle is going to travel, when the vehicle is powered by the first motor and the second motor while stopping the rotation of the rotary shaft,
        determine an operating point of the first motor in such a manner as to increase the power output from that of a case in which the estimated input torque is smaller than the predetermined torque, and an operating point of the second motor in such a manner as to decrease the power output from that of a case in which the estimated input torque is smaller than the predetermined torque, in a case that a change rate of a rotational speed of the drive wheel or a predetermined rotary member in the powertrain is greater than a predetermined value, or in a case that a difference between: an actual torque applied to the predetermined; and an expected torque applied to the predetermined rotary member calculated based on output torques of the first motor and the second motor, is greater than a predetermined value, and
        operate the first motor and the second motor at the determined operating points.

2. The vehicle control device as claimed in claim 1, wherein the controller is further configured to determine the operating points of the first motor and the second motor in such a manner as to achieve a required power to propel the vehicle.

3. The vehicle control device as claimed in claim 2, wherein the controller is further configured to:
    select a combination of the operating point of the first motor determined to increase the power output and the operating point of the second motor determined to decrease the power output from a plurality of combinations, in such a manner as to achieve a required power to propel the vehicle while operating the first motor and the second motor individually at the highest electrical efficiency, and
    operate the first motor and the second motor at the operating points of the selected combination.

4. The vehicle control device as claimed in claim 3, wherein the controller is further configured to:
    select a combination of the operating points of the first motor and the second motor in which the power output of the first motor is largest, from a plurality of combinations of the operating points to achieve a required power to propel the vehicle while operating the first motor and the second motor individually at the highest electrical efficiency,
    determine the operating point of the second motor based on the selected operating point of the first motor, and
    operate the second motor at the determined operating point.

5. The vehicle control device as claimed in claim 1, wherein the controller is further configured to:
    calculate an amount of change in the power output of any one of the first motor and the second motor when the estimated input torque is larger than the predetermined torque,
    calculate an amount of change in the power output of the other motor based on the required power to propel the vehicle and the amount of change in the power output of said one of the motors, and
    calculate the power output of the other motor based on the calculated amount of change in the power output of the other motor.

6. The vehicle control device as claimed in claim 1, wherein the controller is further configured to:
    calculate the power output of any one of the first motor and the second motor when the estimated input torque is larger than the predetermined torque, and
    calculate the power output of the other motor based on the required power to propel the vehicle and the calculated power output of the other motor.

7. The vehicle control device as claimed in claim 1, further comprising:
    another prime mover in addition to the first motor and the second motor;
    wherein the rotary shaft is connected to said another prime mover, and
    wherein the controller is further configured to
        control the locking mechanism in accordance with an operating condition of the vehicle,
        allow the rotary shaft to rotate by disengaging the locking mechanism when propelling the vehicle by delivering torque from said another prime mover to the drive wheels, and
        stop the rotation of the rotary shaft by engaging the locking mechanism when propelling the vehicle by the first motor while stopping said another prime mover.

8. The vehicle control device as claimed in claim 1, wherein the locking mechanism includes a rotary member that is allowed to rotate relatively to the rotary shaft, a stationary member, a first engagement device that engages the rotary member with the stationary member, and a second engagement member that engages the rotary member with the rotary shaft,
    wherein the locking mechanism is adapted to stop the rotation of the rotary shaft by engaging the first engagement device and the second engagement device, and to disengage the first engagement device when the torque larger than the predetermined torque is applied to the rotary shaft.

9. The vehicle control device as claimed in claim 8, wherein:
    the rotary member is arranged to be opposed to the stationary member,
    the first engagement device includes first teeth protruding toward the stationary member,
    the second engagement device includes second teeth protruding toward the rotary member,
    a tooth thickness of each of the first teeth is thinned gradually toward the second teeth, and a tooth thickness of each of the second teeth is thinned gradually toward the first teeth.

10. The vehicle control device as claimed in claim 1,
wherein an output shaft of the second motor is connected to a gear, and
wherein the gear is immersed into oil at least partially.

\* \* \* \* \*